Sept. 16, 1958 W. R. YOUNG, JR 2,852,624

STABILIZED POSITIVE FEEDBACK

Filed Dec. 12, 1956 2 Sheets-Sheet 1

INVENTOR
W. R. YOUNG, JR.
BY George C. Lord
ATTORNEY

STABILIZED POSITIVE FEEDBACK

Filed Dec. 12, 1956 2 Sheets-Sheet 2

INVENTOR
W. R. YOUNG, JR.
BY George C. Lord
ATTORNEY

United States Patent Office 2,852,624

Patented Sept. 16, 1958

2,852,624

STABILIZED POSITIVE FEEDBACK

William R. Young, Jr., Summit, N. J., assignor to Bell Telephone Laboratories, Incorporated, New York, N. Y., a corporation of New York Application December 12, 1956, Serial No. 627,767

6 Claims. (Cl. 179—171)

This invention relates to regenerative amplifier circuits and has as a primary object the provision of a stable regenerative amplifier.

It has long been recognized that in an amplifier circuit considerable increase in gain and selectivity can be obtained by the use of positive feedback. However, the past experience has been that such circuits are unstable since the minor variations in circuit parameters to be expected during normal operation and causing only small changes in the gain of the active element are nevertheless reflected in large changes in overall gain. Also, small changes in tube gain are likely to so modify the loop gain as to result in oscillations in the circuit at or near the frequency of the desired signal. Such limitations have in general made regenerative amplifiers of little value except in those applications where they are constantly attended by skilled operators.

In accordance with the present invention there is provided a regenerative amplifier employing a gain regulating element, separate from the active element (amplifying tube), for limiting the overall gain to maintain stable oscillations at one frequency at which the loop parameters are such as to support oscillations, while at the same time establishing such a loop transmission characteristic that the gain is high at a second frequency separated from the oscillation frequency by a region in which the loop gain is so low that the circuit is useless as an amplifier. This permits the use of the circuit for obtaining high gain and selectivity at such second frequency. This circuit maintains stable operation despite minor variations in circuit parameters as a result of the fact that the limiter is controlled by the normal oscillation of the circuit at the first frequency which is remote from the signal or operating frequency.

The invention is described in more detail in the following discussion relating to the drawing in which.

Figure 3A:
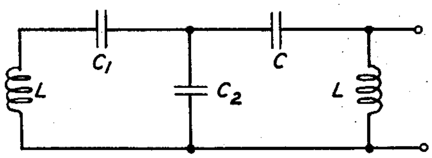
Figure 3B:
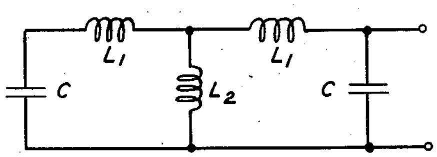
Figure 3C:
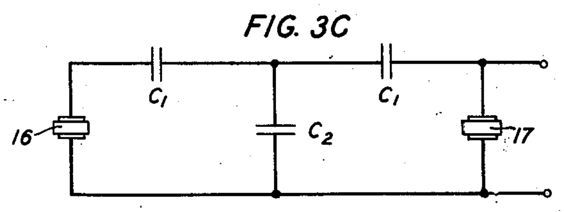
Figures 4, 4A:
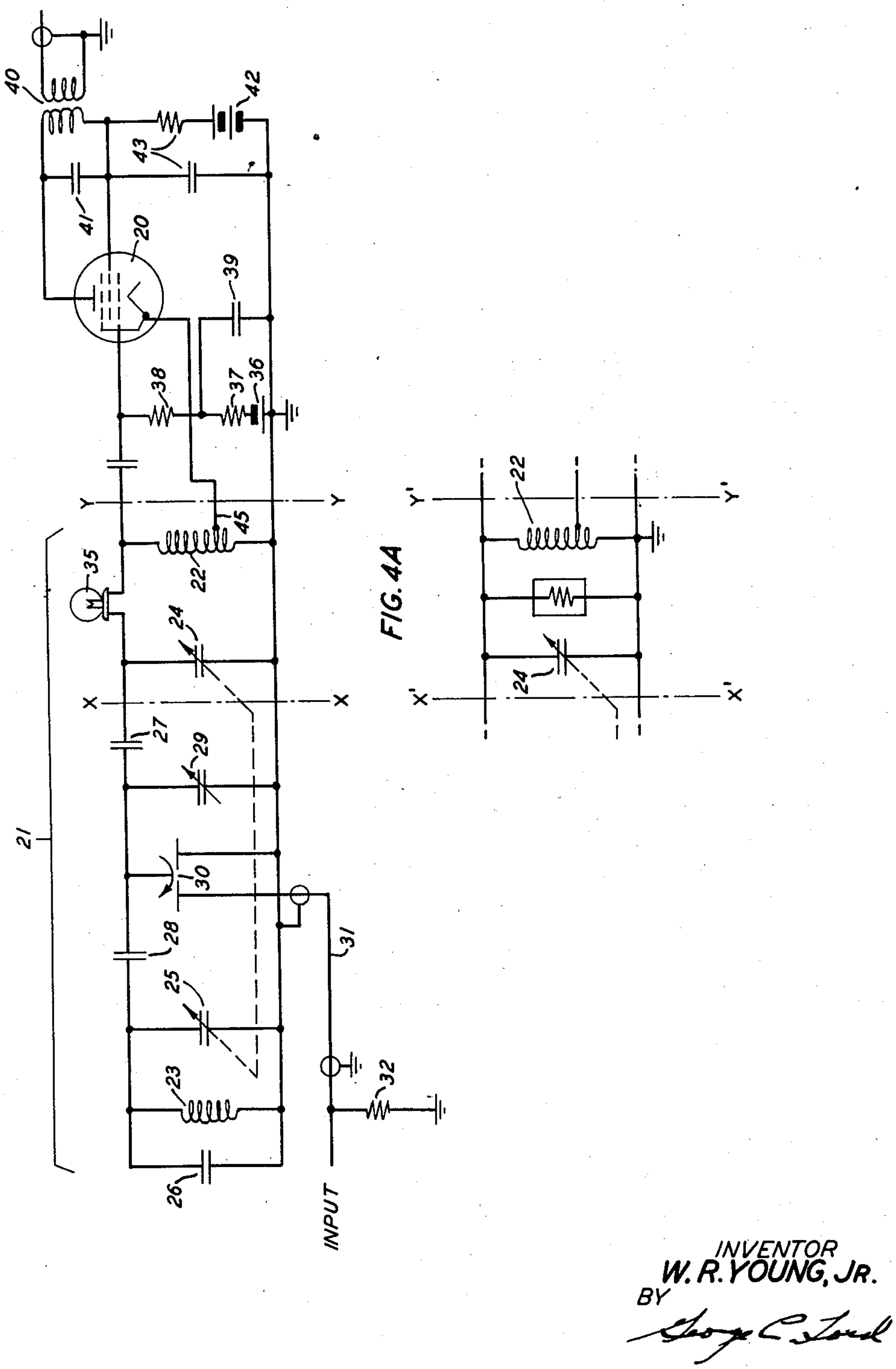

Figs. 3A, 3B, and 3C are schematic circuit diagrams of two terminal networks having frequency-impedance characteristics typical of those required in the circuit of the invention;

Fig. 4 is a schematic circuit diagram of an amplifier circuit which embodies the present invention; and Fig. 4A is a modification of that portion of the circuit of Fig. 4 between the dash-dot lines XX—YY.

Figure 1:
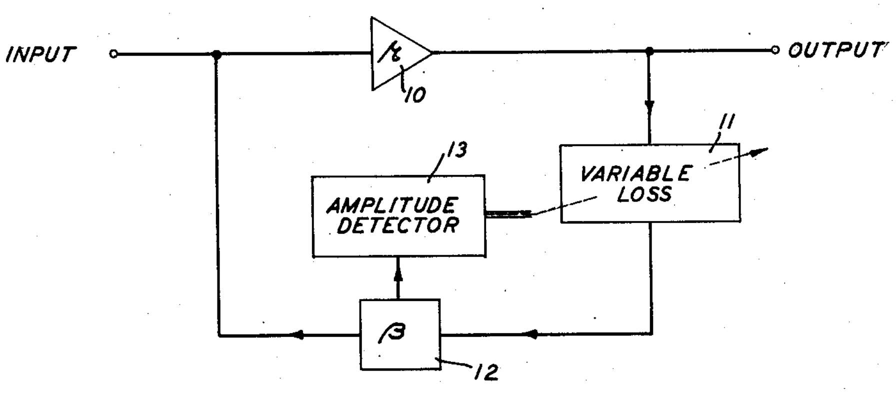
Fig. 1 is a single line, block diagram of the basic circuit of the present invention.

Referring first to Fig. 1, the amplifying path comprises an active transducer 10 having a transmission gain $\mu$, such as a vacuum tube or transistor amplifier. Interconnecting the output and input of the transmission path to provide the usual regenerative or positive feedback loop is the feedback path including a variable loss device 11 of transmission ratio $k$ and a network 12 having the required transmission characteristic $\beta$. In this block diagram the variable loss device 11 is illustrated as being controlled by an amplitude-detector 13. The interaction between detector 13 and the loss device 11 is such that the loss in the loop is increased in direct relation to the strength of the signal in the loop. As will appear from the later discussion, particularly with respect to Fig. 4, it may be found practical to combine the functions of the two devices 11 and 13 in a single circuit element.

The circuit parameters are so proportioned that the loop gain, $\mu k\beta$ becomes equal to unity.

In order to achieve regenerative amplification the feedback loop is so designed that $\mu k\beta$ has a value slightly less than unity at a second frequency while being considerably less than unity at intermediate frequencies. Accordingly, the effect of the positive feedback is to amplify a signal of this second frequency to a greater extent than it would have been amplified without the positive feedback.

One method of understanding the circuit of this invention is by comparing its operation with that of a well-known prior art device that also utilizes positive feedback, namely, the oscillating detector. Such a circuit is similar to that shown in Fig. 1 particularly in most functional respects, but with certain important exceptions. At least certain of these differences are the factors that are responsible for the new and advantageous results achieved by the circuit of this invention. Among them are the facts that: the limiting function is performed by the vacuum tube itself rather than by an external circuit element; the input signal is limited to a frequency near the oscillating frequency instead of being separated therefrom by a region in which the gain is low; and the output is a beat note, usually in the audio range rather than the amplified input signal.

Figure 2A:
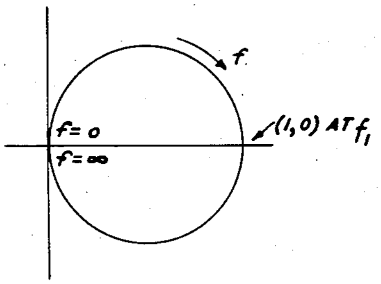
Figs. 2A and 2B are polar plots illustrative of the operation of the invention.

Fig. 2A is a plot in the well known polar form of the gain around the loop for a typical oscillating detector, which uses a single tuned circuit for determining the frequency characteristic thereof. The diagram is a polar plot of the amplitude and phase of the transmission around the loop and shows the locus thereof as frequency changes from 0 through resonance to infinity. At the frequency of resonance of the tuned circuit, $f_1$, the loop gain will be unity and the phase angle 0. Under such circumstances the circuit will produce oscillations, as is well known. If the transmission were greater than unity the amplitude of the oscillations would increase; however, the limiting action of the vacuum tube causes the gain to be reduced by the increasing amplitude of oscillation so that stable operation is maintained during oscillation.

When there is introduced into such a circuit an external signal of a frequency near the frequency of oscillation, $f_1$, that signal is amplified by an amount much greater than it would have been if the tube were an ordinary amplifier-detector. This is because the gain is enhanced by the positive feedback by the factor $$\frac{1}{1-\mu k\beta}$$

It may be seen by an examination of the polar plot of Fig. 2A that at frequencies near $f_1$ the value of $\mu k\beta$ is nearly 1,0 and therefore the denominator of this expression is very small and the expression itself large. Also because of the fact that the tube is operating in the nonlinear region as is required both for limiting the oscillation and for detecting, the input signal will heterodyne with the local oscillations to produce a beat note which is customarily an audio tone. The operation of such circuits is limited to signal frequencies close to the oscillation frequency and consequently for practical use only as detectors where the output is the audio beat note between the signal and oscillating frequencies.

Figure 2B:
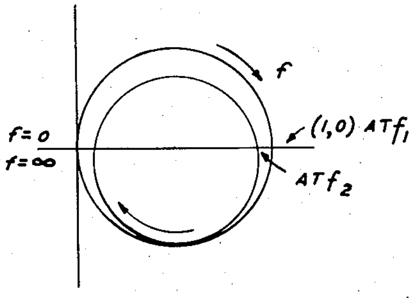

The present system differs from the oscillating detector in an important respect in that the loop transmission characteristic is so proportioned that a high loop gain approaching unity is achieved at a frequency quite remote from the frequency of oscillation. Fig. 2B shows a typical polar diagram of a circuit including such a network in accordance with the invention. In this case it will be observed that $\mu k\beta$ is again 1,0 at the frequency $f_1$ and is maintained at this value as a result of the oscillations established at this frequency and the amplitude control effected by the loss device 11 in response to such oscillations. It will also be noted that $\mu k\beta$ comes back, at a different frequency, $f_2$, to zero phase angle and a value only slightly less than unity. Signals of frequency $f_2$ and close thereto will accordingly be highly amplified by the circuit. As a result of the positive feedback, the amplification is materially higher than would be achieved by the active element 10 alone. Further, the action of the circuit will be stable as a result of the action of the loss device in response to the oscillations of frequency $f_1$ produced in the circuit. Since these oscillations are at a frequency removed from the signal frequency $f_2$ and separated therefrom by a region in which the value of $\mu k\beta$ is low there will be no interference with the signals.

The stablizing action, resulting from the limiting effect of the loss device 11 as effected by the oscillations generated in the circuit, eliminates one of the main difficulties previously encountered with regenerative amplifiers. In the past such amplifiers have been found to be highly sensitive to small changes in gain particularly those caused by minor variations in the circuit parameters of the active element. Such small changes in gain of the active element have been found to be very likely to cause such a change in the loop gain than it includes the point 1,0 whereupon the circuit will break into oscillations often at a frequency in the vicinity of the operating frequency. In general this has made such amplifiers unsuitable for use in unattended locations, mobile radio telephone substations, and the like.

Figs. 3A, 3B, and 3C show three typical two terminal networks which provide the double resonant characteristics required for the feedback network 12.

It may be readily demonstrated that the network of Fig. 3A having the values of capacity and inductance indicated thereon will have two antiresonant frequencies, namely:

$$f_1=\frac{1}{2\pi\sqrt{LC_1}}$$

and $$f_2=\frac{1}{2\pi\sqrt{L\frac{C_1C_2}{2C_1+C_2}}}$$

It will be observed that the impedance in the coupling arm $C_2$ does not affect the performance at the resonant frequency $f_1$.

Similarly for the network of Fig. 3B the two antiresonant frequencies will be:

$$f_1=\frac{1}{2\pi\sqrt{L_1C}}$$

and $$f_1=\frac{1}{2\pi\sqrt{C\frac{L_1L_2}{L_1+2L_2}}}$$

Fig. 3C shows an equivalent network employing piezoelectric crystals 16 and 17 arranged in a manner obviously analogous to the circuits of Figs. 3A and 3B. This illustrates the possibility of employing such elements where the selectivity required is higher than can be obtained with conventional inductors or capacitors.

Fig. 4 is a complete schematic circuit diagram of a regenerative amplifier in accordance with this invention. This circuit corresponds to the simplified block diagram of Fig. 1, although the functions of the amplitude-detector 13 and the variable loss device 11 thereof have been combined into a single circuit element. The beta network of Fig. 4 is in essence of the type of Fig. 3A with slight modifications to adapt it to use with a vacuum tube and to provide the required differences in impedance at the two resonant frequencies $f_1$ and $f_2$.

In the circuit of Fig. 4 the active element comprises a pentode vacuum tube 20. The plate and grid circuits of the tube 20 are interconnected through the network 21 which acts as the feedback or beta path. For this purpose the inductance coil 22 is provided with a tap 45 which is connected to the cathode of tube 20. The tube 20 has its control grid connected to the upper terminal of inductor 22 and its plate to the lower terminal. This will be recognized as providing a positive feedback analogous to that provided in the well known Hartley oscillator circuit. The inductor 22 may be thought of as a perfect transformer giving the proper phase reversal and impedance step-up between the plate and grid circuits.

The network 21 is of the type shown in Fig. 3A with modifications to adapt it to provide for introducing the input signal into the amplifier, to permit adjustments in the operating parameters, and the like. Inductors 22 and 23 correspond to the inductors L of Fig. 3A. The small gang tuned variable capacitors 24 and 25 are provided to permit adjustment of the effective inductances of these coils and consequently of the operating frequency of the amplifier. There is connected across the coil 23 an additional capacitor 26 of such value as to compensate for inherent capacities in other portions of the circuit so as to maintain a symmetrical relation in the circuit. Capacitors 27 and 28 are the main tuning capacitors corresponding to the capacitors $C_1$ of Fig. 3A. The coupling capacity corresponding to the capacitor $C_2$ of Fig. 3A is provided by the parallel combination of capacitor 29 with the differential capacitor 30.

The input signal is applied over the shielded line 31 to the left hand fixed plates of capacitor 30. A resistor 32 provides dissipation for determining the required impedance of the circuit at the resonant frequency $f_2$. This element may be a separate circuit element as shown or, in the more usual situation, the desired resistance value may be provided by the internal impedance of the signal source. As is indicated by the curve of Fig. 2B it is necessary that the loss in the beta circuit at the resonant frequency $f_2$ be lower than at the oscillating frequency $f_1$. This required lower impedance of the network 21 is provided by the effect of the resistor 32. By the use of the differential capacitor 30 the amount of dissipation introduced into the circuit may be varied without variation of the capacity in that branch of the circuit.

Further, it will be noted from an examination of the formula set forth in connection with Fig. 3A that the circuit elements in this coupling branch do not effect the performance of the network 21 at the resonant frequency $f_1$. Accordingly, by the control of the differential capacitor 30 the impedance at the signal frequency $f_2$ may be adjusted to the desired value without any effect on the impedance and consequently on the loop gain at the oscillating frequency $f_1$.

The connection of the signal input through to differential capacitor 30 also provides for a good impedance match between the signal source and the network 21. Further a large voltage step-up is obtained between the source and the grid of the tube 20 as is desirable.

The functions of the amplitude detector and variable loss device (Fig. 1) are jointly performed by the small incandescent lamp 35 connected to the upper terminal of coil 22. In this position in the circuit, current of either antiresonant modes of the network 21 flows through the filament of the lamp 35. As oscillations are built up, the increased current through the lamp heats up its filament and increases its alternating current resistance. This lowers the impedance of the network 21 at both of its antiresonant frequencies $f_1$ and $f_2$ and accordingly the loop gain. The circuit constants are so proportioned that a stable oscillation level at the frequency $f_1$ is established at an amplitude that is well below the level at which the tube 20 would draw grid current or be operated at a point on its characteristic where there is any marked lack of linearity.

The battery 36 supplies grid biasing voltage, being connected in circuit through the filter comprising resistors 37 and 38 and capacitor 39. The signal output is taken off through a transformer 40 the primary circuit of which may be tuned to the signal frequency by means of the capacitor 41. Plate and screen grid voltages are supplied from the battery 42 through a usual type filter 43.

Alternatively the circuit may be used as a frequency converter in which case the circuit parameters such as the grid bias voltage will be adjusted to cause the tube 20 to operate in a non-linear portion of its characteristic. For such operation, of course, the circuit 40—41 will be tuned to the beat frequency ($f_2 \pm f_1$).

What is claimed is:

1. An amplifying system comprising an amplifier, a feedback path therefor including circuit means of impedance varying with frequency to produce a loop gain which is substantially unity with zero phase angle at a first predetermined frequency and is less than unity with zero phase angle at a second predetermined frequency, and circuit means included within said feedback path to reduce the loop gain at both of said frequencies whenever it rises above unity at said first frequency and to increase the loop gain at both of said frequencies whenever it tends to fall below unity at said first frequency.

2. An amplifying system comprising an amplifier, a feedback path therefor including circuit means of impedance varying with frequency to produce a loop gain which is substantially unity with zero phase angle at a first predetermined frequency outside of the band of signals to be amplified and approaches but is less than unity with zero phase angle at a second predetermined frequency within the signal band, and circuit means included within said feedback path to reduce the loop gain at both of said frequencies whenever it rises above unity at said first frequency and to increase the loop gain at both of said frequencies whenever it tends to fall below unity at said first frequency.

3. An amplifying system comprising an amplifier, a feedback path therefor including circuit means of impedance varying with frequency to produce a loop gain which is substantially unity with zero phase angle at a first predetermined frequency outside of the signal band and approaches but is less than unity with zero phase angle at a second predetermined frequency within the band of signals to be amplified and is substantially less than unity in the region between said first frequency and the signal band, and circuit means included within said feedback path to reduce the loop gain at said first frequency and in the signal band whenever it rises above unity at said first frequency and to increase the loop gain at said first frequency and in the signal band whenever it tends to fall below unity at said first frequency.

4. An amplifying system comprising an amplifier, a feedback path interconnecting the output and input of said amplifier and forming with said amplifier a closed loop circuit, a frequency selective network in said loop circuit and having such a characteristic relative to the gain characteristic of said amplifier that the loop gain is unity with zero phase shift at one frequency and only slightly less than unity with zero phase shift at a second frequency, circuit means included within said loop circuit responsive to the oscillations traversing said loop for limiting the loop gain to maintain stable operation at both said frequencies, and means for impressing oscillations of said second frequency to be amplified upon the input of said amplifier.

5. An amplifying system comprising an amplifier, a feedback path interconnecting the output and input circuits of said amplifier, an impedance network included in the feedback loop and having a characteristic so varying with frequency that the transmission gain of the feedback loop is unity with zero phase shift at a first frequency and only slightly less than unity with zero phase shift at a second frequency separated from said first frequency by a region in which the transmission gain of the feedback loop is markedly less than unity, a current limiter included in the feedback loop and operative to maintain stable oscillation at said first frequency, and means for introducing into said input circuit signals of said second frequency for amplification.

6. An amplifying system comprising an amplifier, a feedback path from the output to the input of said amplifier; a network in said feedback path comprising two branches each including reactance elements of opposite sign and together determining a first antiresonant frequency, a coupling arm comprising a reactance element effective for determining a second antiresonant frequency, and energy dissipative means included in said coupling arm for causing the network to have an impedance lower at said second antiresonant frequency than at said first frequency; gain regulating means included within said feedback path and separate from said amplifier and responsive to oscillations of said first frequency for determining the transmission gain of the feedback loop including said amplifier and said feedback path, and means for introducing signals of frequency of the order of said second frequency for amplification.

References Cited in the file of this patent

UNITED STATES PATENTS

| | | |
|---|---|---|
| 2,362,195 | Edson | Nov. 7, 1944 |

FOREIGN PATENTS

| | | |
|---|---|---|
| 456,062 | Great Britain | Oct. 28, 1936 |
| 90,158 | Sweden | Sept. 7, 1937 |